US011544108B2

(12) United States Patent
Sodagar

(10) Patent No.: US 11,544,108 B2
(45) Date of Patent: Jan. 3, 2023

(54) METHOD AND APPARATUS FOR FUNCTIONAL IMPROVEMENTS TO MOVING PICTURE EXPERTS GROUP NETWORK BASED MEDIA PROCESSING

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 409 days.

(21) Appl. No.: 16/854,869

(22) Filed: Apr. 21, 2020

(65) Prior Publication Data

US 2020/0341806 A1 Oct. 29, 2020

Related U.S. Application Data

(60) Provisional application No. 62/837,608, filed on Apr. 23, 2019.

(51) Int. Cl.
*G06F 9/48* (2006.01)
*H04L 67/10* (2022.01)

(52) U.S. Cl.
CPC ............ *G06F 9/4881* (2013.01); *H04L 67/10* (2013.01)

(58) Field of Classification Search
None
See application file for complete search history.

(56) References Cited

U.S. PATENT DOCUMENTS 11,249,796 B2 * 2/2022 Kolan ................ G06F 9/45533
11,256,546 B2 * 2/2022 You ...................... G06F 9/5027
11,348,307 B2 * 5/2022 Bae .................... H04N 21/6587
11,381,885 B2 * 7/2022 Bae .................. H04N 21/64784
11,399,077 B2 * 7/2022 Sodagar .................. H04L 67/60
11,431,817 B2 * 8/2022 Kolan .................. H04L 65/765
2013/0198760 A1 * 8/2013 Cuadra ................. G06F 9/4881 718/106
2017/0076246 A1 * 3/2017 Volkov ..................... G06N 5/04
2019/0222621 A1 * 7/2019 Kolan ..................... H04L 67/10

(Continued)

OTHER PUBLICATIONS

Systems, "Potential enhancements for Network-based Media Processing", International Organisation for Standardisation, Mar. 29, 2019, ISO/IEC JTC1/SC29/WG11, N18401 pp. 1-106 (total 116 pages).

*Primary Examiner* — Hiren P Patel
(74) *Attorney, Agent, or Firm* — Sughrue Mion, PLLC

(57) ABSTRACT

A method of processing media content in Moving Picture Experts Group (MPEG) Network Based Media Processing (NBMP) includes obtaining, from a function repository storing one or more functions for processing the media content, at least one among the one or more functions, each of the at least one among the one or more functions having a function descriptor indicating, for a respective one among the one or more functions, a maximum throughput, a minimum buffer size, a maximum size of metadata and a maximum frequency between two instances of the metadata, and obtaining a task for processing the media content, based on the obtained at least one among the one or more functions, the task having a task descriptor indicating, for the task, a maximum throughput, a minimum buffer size, a maximum size of metadata and a maximum frequency between two instances of the metadata.

20 Claims, 5 Drawing Sheets

(56) References Cited

U.S. PATENT DOCUMENTS

| | | | | |
|---|---|---|---|---|
| 2020/0092530 | A1* | 3/2020 | Wang | H04N 13/161 |
| 2020/0177694 | A1* | 6/2020 | Kolan | H04L 67/34 |
| 2020/0304508 | A1* | 9/2020 | Bae | H04L 63/0876 |
| 2020/0341802 | A1* | 10/2020 | Sodagar | G06F 9/5038 |
| 2020/0341803 | A1* | 10/2020 | Sodagar | G06F 9/5044 |
| 2022/0164453 | A1* | 5/2022 | Kammachi Sreedhar | H04L 9/088 |
| 2022/0167026 | A1* | 5/2022 | You | G06F 9/5038 |

* cited by examiner

300
Third Party Entity 380
Instruction
NBMP Source 310
NBMP Workflow API
Function Discovery API
NBMP Workflow Manager 320
Function Discovery API
Function Repository 330
NBMP Task API
NBMP Link API
Function Discovery API
Network Controller 340
Task 1
Config.
Media Processing
Task 2
Media Processing Entities 350
351
352
353
354
Media Source 360
Media Resource, Supplementary Information
Media Sink 370

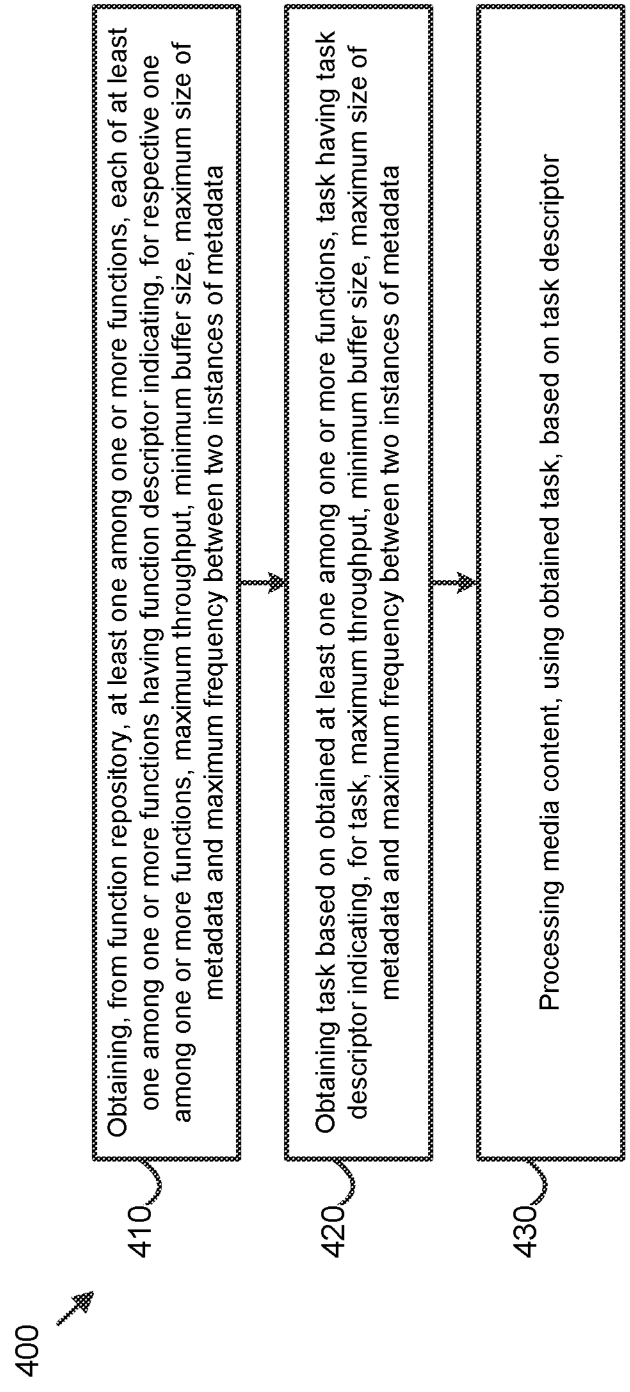
FIG. 4
400
410
Obtaining, from function repository, at least one among one or more functions, each of at least one among one or more functions having function descriptor indicating, for respective one among one or more functions, maximum throughput, minimum buffer size, maximum size of metadata and maximum frequency between two instances of metadata
420
Obtaining task based on obtained at least one among one or more functions, task having task descriptor indicating, for task, maximum throughput, minimum buffer size, maximum size of metadata and maximum frequency between two instances of metadata
430
Processing media content, using obtained task, based on task descriptor 500
510
520
530
540
First Obtaining Code
Second Obtaining Code
Processing Code
Third Obtaining Code

METHOD AND APPARATUS FOR FUNCTIONAL IMPROVEMENTS TO MOVING PICTURE EXPERTS GROUP NETWORK BASED MEDIA PROCESSING

CROSS-REFERENCE TO RELATED APPLICATION

This application claims priority from U.S. Provisional Patent Application No. 62/837,608, filed on Apr. 23, 2019, in the U.S. Patent and Trademark Office, the disclosure of which is incorporated herein by reference in its entirety.

BACKGROUND

The Moving Picture Experts Group (MPEG) Network Based Media Processing (NBMP) project has developed a concept of processing media on cloud. However, current NBMP design does not provide an application program interface (API) abstraction for network management. Current NBMP design only provides APIs for cloud resources such as a hardware platform.

Further, in NBMP, current response parameters are not well-defined. When multiple entries are returned from a function repository, a source or an NBMP manager may make a decision between the returned entries. For example, if the source makes such a decision, then it might be easy because the source can read the returned multiple entries and perform a manual selection. However even in this case, the source might have a hard time selecting a correct function from the returned multiple entries. In another example, if the NBMP manager makes the decision after reading the returned multiple entries, the NBMP manager may need some reference point to make the decision.

SUMMARY

According to embodiments, a method of processing media content in Moving Picture Experts Group (MPEG) Network Based Media Processing (NBMP) is performed by at least one processor, and includes obtaining, from a function repository storing one or more functions for processing the media content, at least one among the one or more functions, each of the at least one among the one or more functions having a function descriptor indicating, for a respective one among the one or more functions, a maximum throughput, a minimum buffer size, a maximum size of metadata and a maximum frequency between two instances of the metadata, obtaining a task for processing the media content, based on the obtained at least one among the one or more functions, the task having a task descriptor indicating, for the task, a maximum throughput, a minimum buffer size, a maximum size of metadata and a maximum frequency between two instances of the metadata, and processing the media content, using the obtained task, based on the task descriptor.

According to embodiments, an apparatus for processing media content in Moving Picture Experts Group (MPEG) Network Based Media Processing (NBMP) includes at least one memory configured to store program code, and at least one processor configured to read the program code and operate as instructed by the program code, the program code including first obtaining code configured to cause the at least one processor to obtain, from a function repository storing one or more functions for processing the media content, at least one among the one or more functions, each of the at least one among the one or more functions having a function descriptor indicating, for a respective one among the one or more functions, a maximum throughput, a minimum buffer size, a maximum size of metadata and a maximum frequency between two instances of the metadata, second obtaining code configured to cause the at least one processor to obtain a task for processing the media content, based on the obtained at least one among the one or more functions, the task having a task descriptor indicating, for the task, a maximum throughput, a minimum buffer size, a maximum size of metadata and a maximum frequency between two instances of the metadata, and processing code configured to cause the at least one processor to process the media content, using the obtained task, based on the task descriptor.

According to embodiments, a non-transitory computer-readable medium stores instructions that, when executed by at least one processor of an apparatus for processing media content in Moving Picture Experts Group (MPEG) Network Based Media Processing (NBMP), cause the at least one processor to obtain, from a function repository storing one or more functions for processing the media content, at least one among the one or more functions, each of the at least one among the one or more functions having a function descriptor indicating, for a respective one among the one or more functions, a maximum throughput, a minimum buffer size, a maximum size of metadata and a maximum frequency between two instances of the metadata, obtain a task for processing the media content, based on the obtained at least one among the one or more functions, the task having a task descriptor indicating, for the task, a maximum throughput, a minimum buffer size, a maximum size of metadata and a maximum frequency between two instances of the metadata, and process the media content, using the obtained task, based on the task descriptor.

BRIEF DESCRIPTION OF THE DRAWINGS

FIG. 4 is a flowchart of a method of processing media content in MPEG NBMP, according to embodiments.

DETAILED DESCRIPTION

Embodiments described herein provide functional improvements to the MPEG NBMP standard. Such improvements increase media processing efficiency, increase speed and lower cost of deployment of media services, and allow large scale deployment of media services by leveraging public, private or hybrid cloud services.

In examples, the functional improvements to the MPEG NBMP standard include a simplification of a description of a function group including multiple functions for processing media content, using a function descriptor. Also, a media source and a media sink are added to a workflow for processing media content, and characterizing their inputs and outputs, using task descriptors. Function and task inputs and outputs are better characterized by adding buffer throughput, buffer size, metadata size and frequency parameters to input and output descriptors. Function groups and task workflows are better characterized by adding a timing descriptor to a connection map descriptor. Timing requirements and abstraction of a workflow are improved by separating timing parameters from explicit hardware parameters, and adding additional extensive parameters to the timing descriptor.

Figure 1:
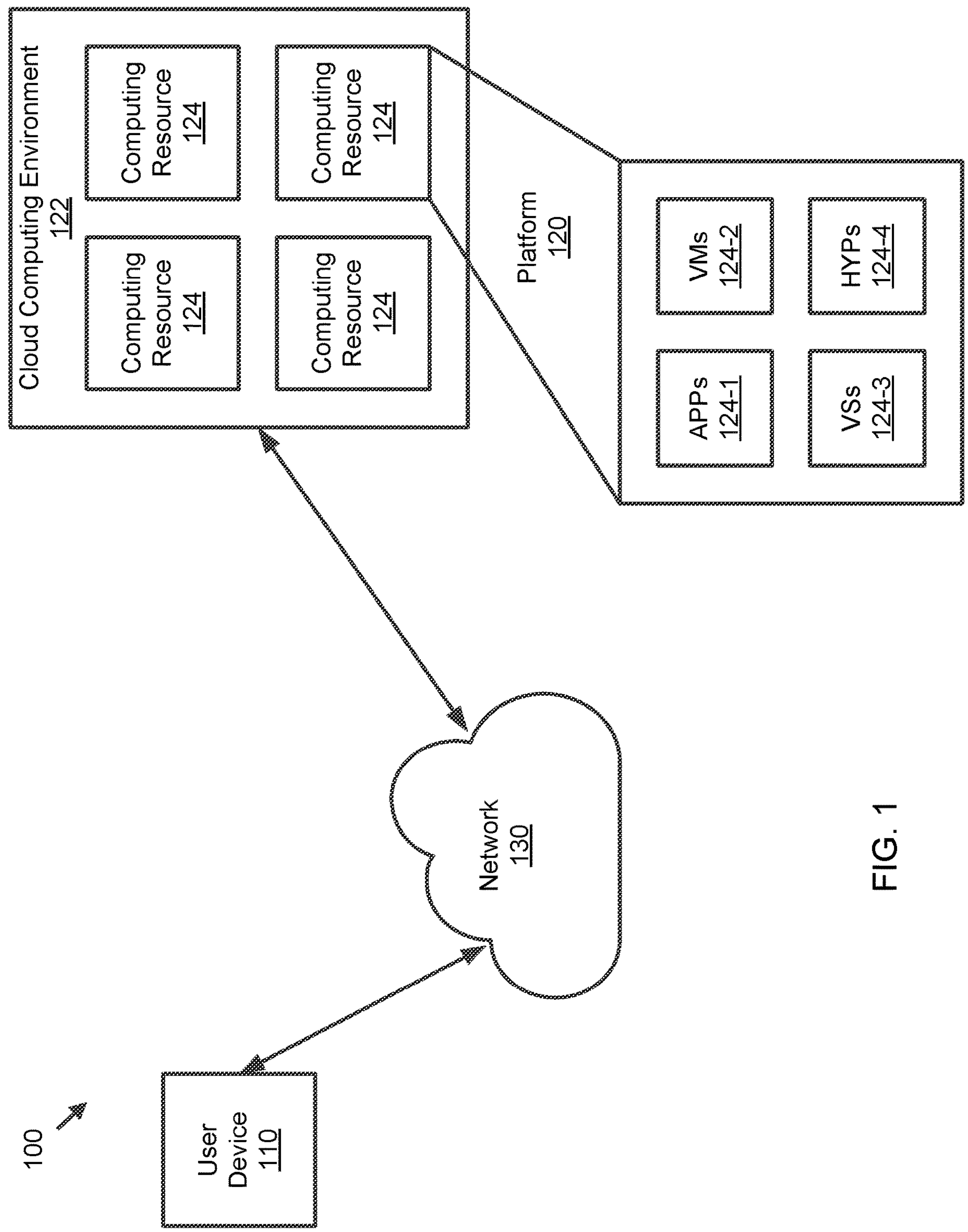
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
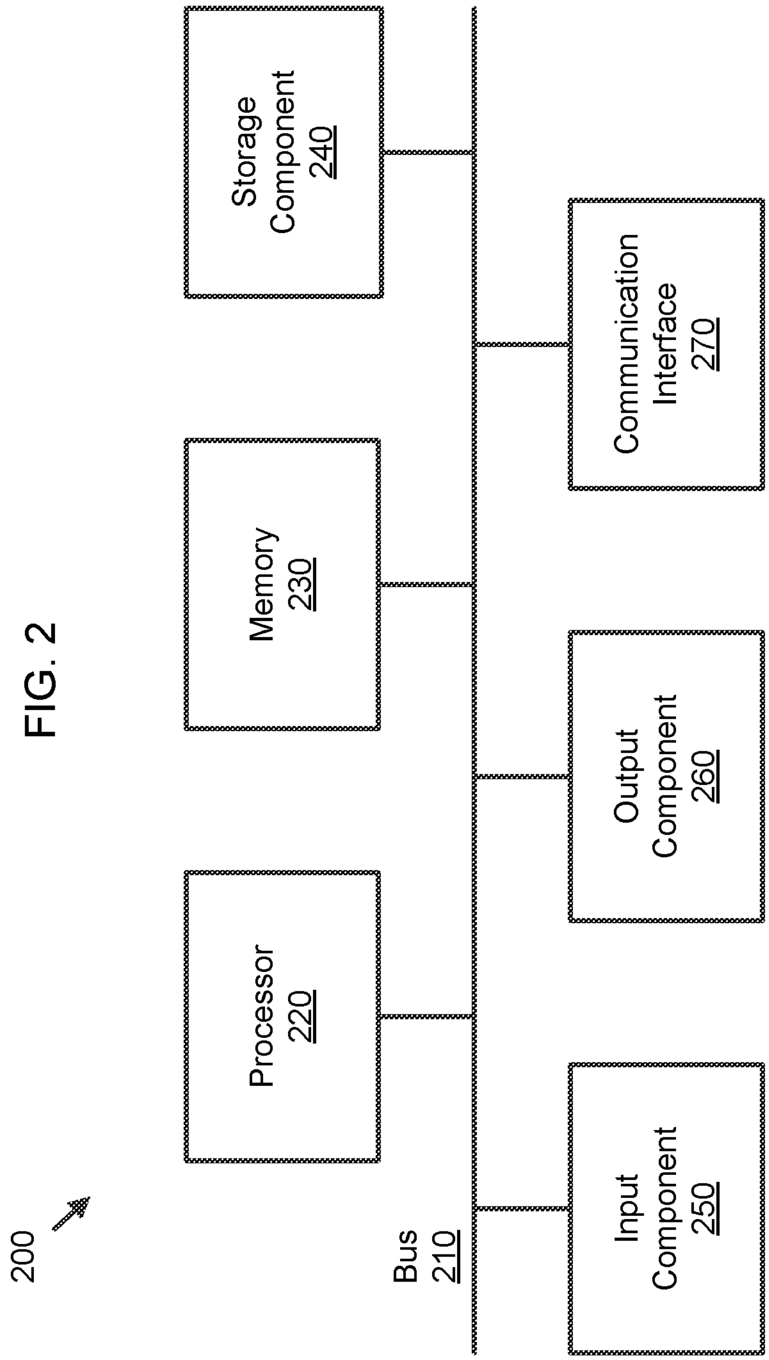
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
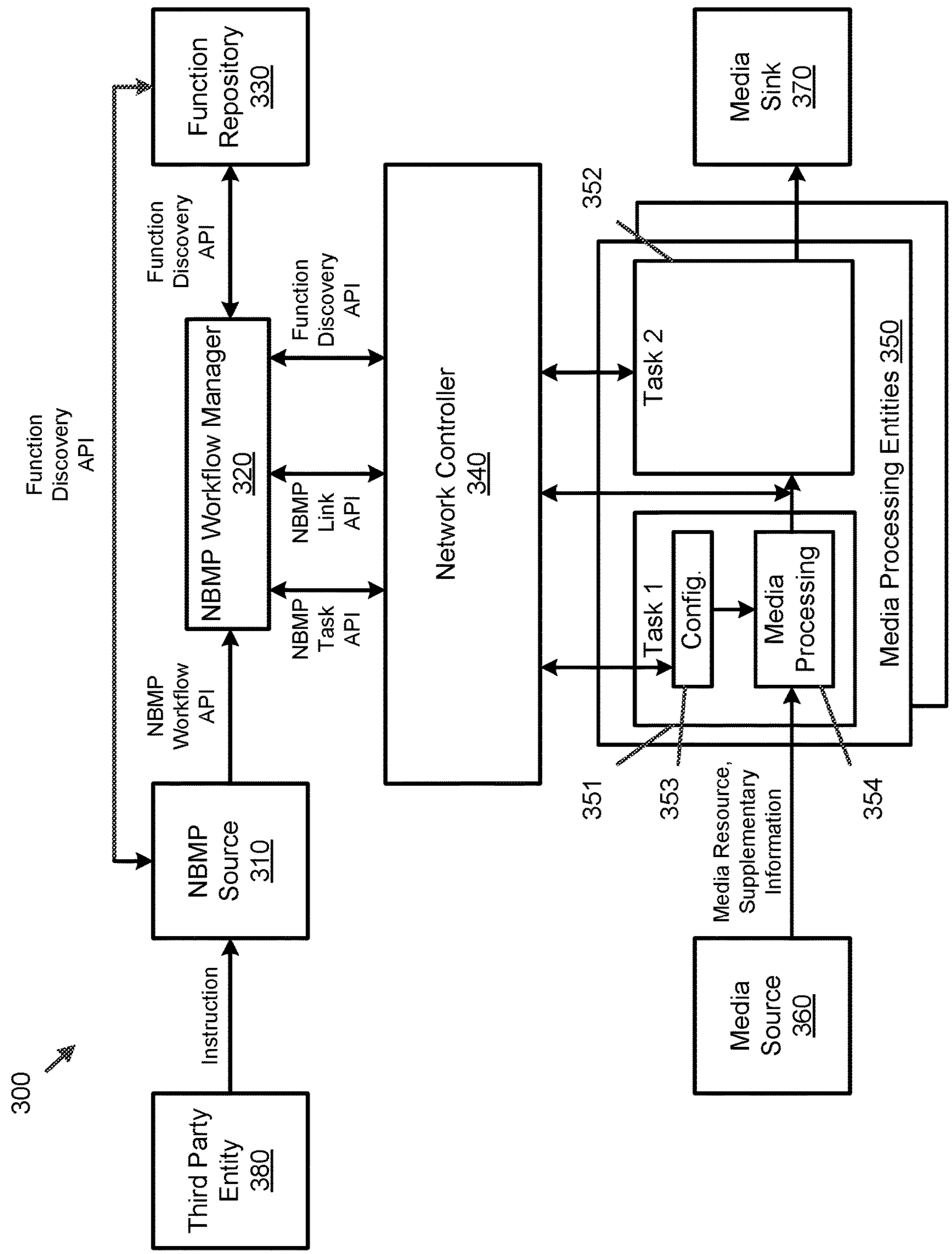
FIG. 3 is a block diagram of an NBMP system, according to embodiments.

FIG. 3 is a block diagram of an NBMP system 300, according to embodiments.

Referring to FIG. 3, the NBMP system 300 includes an NBMP source 310, an NBMP workflow manager 320, a function repository 330, a network controller 340, one or more media processing entities 350, a media source 360, and a media sink 370.

The NBMP source 310 may receive instructions from a third party entity 380, may communicate with the NBMP workflow manager 320 via an NBMP workflow API, and may communicate with the function repository 330 via a function discovery API. For example, the NBMP source 310 may send a workflow description document to the NBMP workflow manager 320, and may read a function description of functions that are stored in a memory of the function repository 330. The functions may include media processing functions such as, for example, functions of media decoding, feature point extraction, camera parameter extraction, projection method, seam information extraction, blending, post-processing, and encoding. The NBMP source 310 may include at least one processor and a memory that stores code configured to cause the at least processor to perform functions of the NBMP source 310.

The NBMP source 310 may request the NBMP workflow manager 320 to create workflow including tasks 351 and 352 to be performed by the one or more media processing entities 350, by sending the workflow description document to the NBMP workflow manager 320. The workflow description document may include descriptors, each of which may include parameters.

For example, the NBMP source 310 may select one or more of the functions stored in the function repository 330, and send, to the NBMP workflow manager 320, the workflow description document including the descriptors for describing details such as input and output data, the selected one or more of the functions, and requirements for a workflow. The workflow description document may further include a set of task descriptions and a connection map of inputs and outputs of the tasks 351 and 352 to be performed by the one or more of the media processing entities 350. When the NBMP workflow manager 320 receives such information from the NBMP source 310, the NBMP workflow manager 320 may create the workflow by instantiating the tasks 351 and 352 based on function names and connecting the tasks 351 and 352 in accordance with the connection map.

Alternatively or additionally, the NBMP source 310 may request the NBMP workflow manager 320 to create a workflow by using a set of keywords. For example, the NBMP source 310 may send, to the NBMP workflow manager 320, the workflow description document including the set of the keywords that the NBMP workflow manager 320 may use to find appropriate one or more of the functions stored in the function repository 330. When the NBMP workflow manager 320 receives such information from the NBMP source 310, the NBMP workflow manager 320 may create the workflow by searching for the appropriate one or more of the functions, using the keywords that may be specified in a Processing Descriptor of the workflow description document, and by using other descriptors in the workflow description document to provision and connect the tasks 351 and 352.

The NBMP workflow manager 320 may communicate with the function repository 330 via a function discovery API, and may communicate with one or more of the media processing entities 350, through the network controller 340, via an NBMP task API, an NBMP link API, and a function discovery API. The NBMP workflow manager 320 may include at least one processor and a memory that stores code configured to cause the at least processor to perform functions of the NBMP workflow manager 320.

The NBMP workflow manager 320 may use the NBMP task API to setup, configure, manage, and monitor one or more of the tasks 351 and 352 of the workflow that is performable by the one or more media processing entities 350. In embodiments, the NBMP workflow manager 320 may use the NBMP task API to update and destroy the tasks 351 and 352. To configure, manage, and monitor the tasks 351 and 352 of the workflow, the NBMP workflow manager 320 may send messages, such as requests, to one or more of the media processing entities 350, wherein each message may have descriptors, each of which may include parameters. The tasks 351 and 352 may each include one or more media processing functions 354 and one or more configurations 353 for the one or more media processing functions 354.

In embodiments, after receiving the workflow description document from the NBMP source 310 that does not include a list of tasks (e.g., includes a list of keywords instead of a list of tasks), the NBMP workflow manager 320 may select the tasks based on descriptions of the tasks in the workflow description document, to search the function repository 330, via the function discovery API, to find appropriate one or more of the functions to run as the tasks 351 and 352 for the current workflow. For example, the NBMP workflow manager 320 may select the tasks based on keywords that are provided in the workflow description document. After the appropriate one or more of the functions are identified using the keywords or the set of task descriptions that is provided by the NBMP source 310, the NBMP workflow manager 320 may configure the selected tasks in the workflow by using the NBMP task API. For example, the NBMP workflow manager 320 may extract configuration data from information that is received from the NBMP source, and configure the tasks 351 and 352 based on the extracted configuration data.

The one or more media processing entities 350 may be configured to receive media content from the media source 360, process the received media content in accordance with the workflow that includes the tasks 351 and 352 and is created by the NBMP workflow manager 320, and output the processed media content to the media sink 370. The one or more media processing entities 350 may each include at least one processor and a memory that stores code configured to cause the at least processor to perform functions of the one or more media processing entities 350.

The network controller 340 may include at least one processor and a memory that stores code configured to cause the at least processor to perform functions of the network controller 340.

The media source 360 may include memory that stores media and may be integrated with or separate from the NBMP source 310. In embodiments, the NBMP workflow manager 320 may notify the NBMP source 310 and/or the media source 360 when a workflow is prepared, and the media source 360 may transmit media content to the one or more of the media processing entities 350 based on a notification that the workflow is prepared.

The media sink 370 may include at least one processor and at least one display that is configured to display media content that is processed by the one or more media processing entities 350.

The third party entity 380 may include at least one processor and a memory that stores code configured to cause the at least processor to perform functions of the third party entity 380.

As discussed above, messages from the NBMP source 310 (e.g. a workflow description document for requesting creation of a workflow) to the NBMP workflow manager 320, and messages (e.g. for causing the workflow to be performed) from the NBMP workflow manager 320 to the one or more media processing entities 350 may include descriptors, each of which including parameters. In embodiments, communication between any of components of the NBMP system 300 using an API may include descriptors, each of which including parameters.

Common Descriptor for Functions and Function Groups

An NBMP specification according to embodiments may define a separate representation for a function group including multiple functions for processing media content. For each function group, the representation may include, for example, an identifier (ID), a name, a connection map and relationship parameters, as detailed below. Instead of using a separate descriptor to describe the representation of a function group, a function descriptor is used to describe the function group. A general descriptor includes a flag to signal that its description is of a function group. Therefore, the general descriptor is extended to include the following in Table 1:

TABLE 1

| General Descriptor Extension: IsFunctionGroup Flag | | | |
|---|---|---|---|
| Parameter Name | Description | Data Type | Cardinality |
| ID | Provides a unique identification in a scope of a function repository/a workflow to a resource | String | 1 |
| Name | Provides a name for identifying a resource | String | 1 |
| Description | Provides a human readable description for an underlying resource | String | 1 |
| Brand | Provides category information for an underlying resource | String | 1 |
| Priority | Provides priority information for an underlying resource | Number | 0-1 |
| Execution Time | Provides an execution time of a resource | String | 0-1 |
| Input Ports | Includes a map of port information where: Map key: port identifier Map value: an object with the following parameters: Stream ID in input descriptor Stream data type in input descriptor | Map | 1 |
| Output Ports | Includes a map of port information where: Map key: port identifier Map value: an object with the following parameters: Stream ID in output descriptor Stream data type in output descriptor | Map | 1 |
| IsFunctionGroup | If this flag is set to “true”, this descriptor describes a function group or a task workflow. In this case, a connection map descriptor exists for this description. A default value is “false”. | Boolean | 0-1 |

The general descriptor is designed for workflow, function and task descriptors.

Because function groups and functions are using the same descriptors, parsing, validation and operations by NBMP entities are simplified.

Media Source Added to Workflow Directed Acyclic Graphs (DAG)

The NBMP specification according to embodiments may add the media source 360 and the media sink 370 to a workflow DAG description. Accordingly, resource requirements for a network connection between the media source 360 and a workflow and between the workflow and the media sink 370 can be described with the same DAG. This approach simplifies documentation of requirements as well as establishment and management of the workflow by the NBMP workflow manager 320.

To achieve the above, the general descriptor is extended to signal whether a node is a source or a sink as follows in Table 2:

TABLE 2

| General Descriptor Extension: Source and Sink | | | |
|---|---|---|---|
| Parameter Name | Description | Data Type | Cardinality |
| ID | Provides a unique identification in a scope of a function repository/a workflow to a resource | String | 1 |
| Name | Provides a name for identifying a resource | String | 1 |
| Description | Provides a human readable description for an underlying resource | String | 1 |
| Brand | Provides category information for an underlying resource | String | 1 |
| Version | Provides a version of a function. A higher number means a newer version. | String | 0-1 |
| SourceOrSink | Signals whether a resource is a media source or a media sink A value “source” indicates that a task is a media source A value “sink” indicates that a task is a media sink Any other value is invalid. Functions shall not include this parameter | String | 0-1 |
| Priority | Provides priority information for an underlying resource | Number | 0-1 |

TABLE 2-continued

General Descriptor Extension: Source and Sink

| Parameter Name | Description | Data Type | Cardinality |
|---|---|---|---|
| Execution Time | Provides an execution time of a resource | String | 0-1 |
| Input Ports | Includes a map of port information where:<br>Map key: port identifier<br>Map value: an object with the following parameters:<br>Stream ID in input descriptor<br>Stream data type in input descriptor | Map | 1 |
| Output Ports | Includes a map of port information where:<br>Map key: port identifier<br>Map value: an object with the following parameters:<br>Stream ID in output descriptor<br>Stream data type in output descriptor | Map | 1 |

Additional Input and Output Parameters

To improve network management of NBMP tasks, input and output parameters are extended to be able to model a throughput and a buffer size for each task. Similarly, a maximum size of metadata parameters and a maximum frequency of metadata instances are added to better model requirements of each task.

Table 3 indicates the following parameters that are added to input and output descriptors:

TABLE 3

Input Descriptor Enhancements

| Parameter Name | Description | Data Type |
|---|---|---|
| Media Parameters | Provides media parameters for resource consumption. The parameters include the following:<br>Collection of media descriptions: each media stream description includes:<br>Stream schema<br>Stream data type<br>Stream information<br>Stream ID<br>Name: string name assigned by an NBMP source<br>Keywords: array of keywords<br>Bandwidth: average bandwidth of a media stream<br>Throughput: maximum accepted throughput<br>Buffer size: minimum input buffer size<br>Media profile: codec/format for underlying media<br>Media type: type of media<br>Clock rate: codec clock rate<br>Protocol: protocol for delivery of or access to media<br>Origination: location where media will be sent from or location from where the media can be fetched from.<br>Note: when origination is missing, a workflow manager may assign origination information of an appropriate media processing entity to a media source so the media source can ingest media using that protocol | Object |
| Metadata Parameters | Provides metadata parameters for resource consumption. The parameters include the following:<br>Collection of metadata descriptions: each metadata stream description includes:<br>Metadata schema<br>Metadata information<br>Metadata stream ID: ID to identify a content component, i.e., a metadata stream<br>Metadata type: type of metadata. Possible values include:<br>Timed: indicates description for timed metadata<br>Non-timed: indicates description of non-timed static metadata<br>Bandwidth: average bandwidth of a metadata stream | Object |

TABLE 3-continued

| Input Descriptor Enhancements | | |
|---|---|---|
| Parameter Name | Description | Data Type |
| | Maximum size: maximum size of metadata in each instance<br>Maximum frequency: a shortest duration between two instances of metadata<br>Metadata dictionary: dictionary of static non-timed metadata. Dictionary contains a collection of key-value pairs. Each key represents a name of a static metadata parameter and a corresponding value indicates a value of that metadata parameter<br>Note: This is only applicable for static non-timed metadata<br>Protocol: Ingest protocol for timed metadata. Example: HTTP. When a workflow manager receives this information, it takes responsibility of returning back with protocol endpoint information of an appropriate media processing entity to a media source so the media source can ingest metadata using that protocol<br>Note: This is only applicable for timed metadata<br>Metadata ingest format: format of timed metadata. Example: JSON, XML | |

TABLE 4

| Output Descriptor Enhancements | | |
|---|---|---|
| Parameter Name | Description | Data Type |
| Media Parameters | Provides media parameters for production by a resource. The parameters include the following:<br>Array of media descriptions: Each media stream description includes:<br>Stream schema<br>Stream data type<br>Stream information<br>Stream ID<br>Name: string name assigned by an NBMP source<br>Keywords: array of keywords<br>Media profile: type of codec or format<br>Media type: type of media<br>Bandwidth: average bandwidth of a media stream<br>Throughput: maximum output throughput<br>Buffer size: minimum output buffer size<br>Clock rate: codec clock rate<br>Protocol: protocol for delivery of a media type including protocol parameters such as port number(s)<br>Destination: where to send an output to<br>Publish format: desired publish format | Object |
| Metadata Parameters | Provides metadata parameters for production by a resource. The parameters include the following:<br>Array of metadata descriptions: each metadata stream description includes:<br>Metadata schema<br>Metadata information<br>Stream ID: ID to identify a content component, i.e., a metadata stream<br>Metadata type: type of metadata<br>Timed: indicates description for timed metadata<br>Non-timed: indicates description of non-timed static metadata<br>Bandwidth: average bandwidth of a metadata stream<br>Maximum size: maximum size of metadata in each instance | Object |

TABLE 4-continued

| Output Descriptor Enhancements | | |
|---|---|---|
| Parameter Name | Description | Data Type |
| | Maximum frequency: a shortest duration between two instances of metadata<br>Metadata dictionary: dictionary of static non-timed metadata. Dictionary contains a collection of key-value pairs. Each key represents a name of a static metadata parameter and a corresponding value indicates a value of that metadata parameter<br>Note: This is only applicable for static non-timed metadata<br>Protocol: distribution protocol for timed metadata. Example: HTTP. When a workflow manager receives this information, it takes the responsibility of returning back with protocol endpoint information of an appropriate media processing entity to a media source so the media source can ingest metadata using that protocol<br>Note: This is only applicable for timed metadata<br>Publish format: desired publish format of timed metadata. Example: JSON, XML<br>Note: Metadata parameters from MPEG MORE and MPEG-V are applicable | |
| Publish Format | Desired output publish format | String |

The input and output descriptors are designed for workflow, function and task descriptors.

Timing Parameters Added to Connection Map Descriptor

To define timing requirements for connections in a provided workflow by the NBMP source 310, a connection map descriptor is extended to include timing requirement parameters. Using these parameters, the NBMP source 310 can signal the timing requirements for each connection in a task DAG to the NBMP workflow manager 320 in Table 5 below:

TABLE 5

| Connection Map Descriptor Improvement | | | |
|---|---|---|---|
| Parameter | Description | Value | Cardinality |
| from | A dictionary structure containing 2 keys: source -identifier and port name<br>Example:<br>{<br>"identifier": video_in",<br>"port_name":"media_output"<br>} | Object | 1 |
| to | A dictionary structure containing 2 keys: target identifier and port name<br>Example:<br>{<br>"identifier":"transcoder_8500k",<br>"port_name":"media_input"<br>} | Object | 1-N |
| Timing Requirements Parameters | Timing requirement parameters for the connection | Object | 0-1 |
| Optional Parameters | Any optional properties or parameters defined for a DAG edge, e.g., references to a requirement descriptor | Object | 0-1 |

A connection map includes a map indicating all connections between functions of a function group.

The connection map descriptor may be used for each connection.

Grouping, Improving and Extending Timing Requirements

The NBMP specification according to embodiments may include a requirement descriptor that has three timing information: delay, bitrate and throughput. This information is grouped with hardware requirements. Because in many workflow descriptions, the hardware requirements are not known or not needed to be described, and adequate timing requirements can define high-level system requirements, the NBMP specification separates the timing requirements from the hardware requirements and expands the parameters such that the high-level requirements can be described in those parameters without any need to describe the exact hardware requirements. This improves a level of abstraction of a workflow description by the NBMP source 310.

Therefore, the NBMP requirement descriptor is split into two descriptors: timing and hardware resources descriptors. Furthermore, parameters of the timing requirement descriptor are expanded as follows in Table 6:

TABLE 6

Timing Requirements Parameters

| Name | Type | Unit | Description | Cardinality |
|---|---|---|---|---|
| Typical Delay | Unsigned Integer | millisecond | Provides a typical expected delay for a resource | 0-1 |
| Average Bitrate | Unsigned Integer | bits per second | Provides a typical throughput for a resource | 0-1 |
| Average Throughput | Unsigned Long Integer | bits per second | Provides throughput requirements for a resource | 0-1 |
| Min Delay | Unsigned Integer | microseconds | Minimum delay (i.e., amount time from input to output sample) adequate for a resource | 0-1 |
| Max Delay | Unsigned Integer | microseconds | Maximum delay required for a resource | 0-1 |
| Min Throughput | Unsigned Long Integer | bits per second | Minimum bandwidth required for a resource | 0-1 |
| Max Throughput | Unsigned Long Integer | bits per second | Maximum bandwidth adequate for a resource | 0-1 |
| Averaging Window | Unsigned Integer | milliseconds | Averaging window used to calculate a throughput and a bitrate. The default is one second | 0-1 |

FIG. 4 is a flowchart of a method 400 of processing media content in MPEG NBMP, according to embodiments. In some implementations, one or more process blocks of FIG. 4 may be performed by the platform 120 implementing the NBMP system 300. In some implementations, one or more process blocks of FIG. 4 may be performed by another device or a group of devices separate from or including the platform 120 implementing the NBMP system 300, such as the user device 110.

As shown in FIG. 4, in operation 410, the method 400 includes obtaining, from a function repository storing one or more functions for processing the media content, at least one among the one or more functions, each of the at least one among the one or more functions having a function descriptor indicating, for a respective one among the one or more functions, a maximum throughput, a minimum buffer size, a maximum size of metadata and a maximum frequency between two instances of the metadata.

In operation 420, the method 400 includes obtaining a task for processing the media content, based on the obtained at least one among the one or more functions, the task having a task descriptor indicating, for the task, a maximum throughput, a minimum buffer size, a maximum size of metadata and a maximum frequency between two instances of the metadata.

In operation 430, the method 400 includes processing the media content, using the obtained task, based on the task descriptor.

The method may further include obtaining, from an NBMP source, a workflow describing the at least one among the one or more functions to be performed, the workflow having a workflow descriptor indicating, for the workflow, a maximum throughput, a minimum buffer size, a maximum size of metadata and a maximum frequency between two instances of the metadata. The at least one among the one or more functions is obtained based on the obtained workflow.

Each of the at least one among the one or more functions, the task and the workflow may be for input resource consumption or output resource production.

Each of the workflow descriptor, the function descriptor and the task descriptor may have a flag indicating whether a respective one of the workflow descriptor, the function descriptor and the task descriptor describes a function group including multiple functions, among the one or more functions.

Based on the flag indicating that the respective one of the workflow descriptor, the function descriptor and the task descriptor describes the function group, the respective one of the workflow descriptor, the function descriptor and the task descriptor further may have a connection map descriptor indicating a connection between the multiple functions and indicating timing requirements parameters of the connection.

The timing requirements parameters may be separate from hardware requirements parameters.

The timing requirements parameters may have, for the connection, a typical delay, an average bitrate, an average throughput, a minimum delay, a maximum delay, a minimum throughput, a maximum throughput and an averaging window.

Although FIG. 4 shows example blocks of the method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel.

Figure 5:
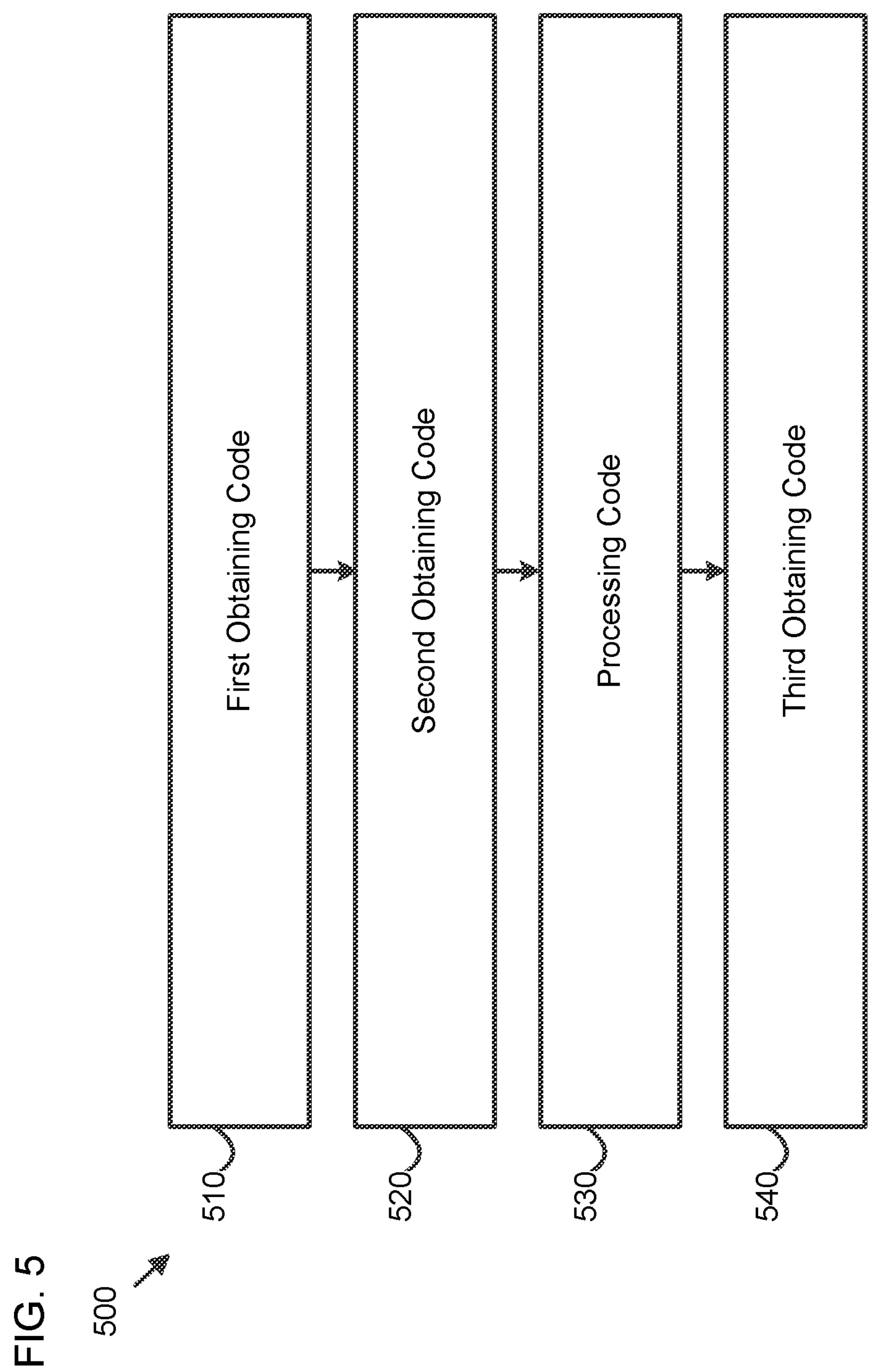
FIG. 5 is a block diagram of an apparatus for processing media content in MPEG NBMP, according to embodiments.

FIG. 5 is a diagram of an apparatus 500 for processing media content in MPEG NBMP, according to embodiments. As shown in FIG. 5, the apparatus 500 includes first obtaining code 510, second obtaining code 520, processing code 530 and third obtaining code 540.

The first obtaining code 510 is configured to cause the at least one processor to obtain, from a function repository storing one or more functions for processing the media content, at least one among the one or more functions, each of the at least one among the one or more functions having a function descriptor indicating, for a respective one among the one or more functions, a maximum throughput, a minimum buffer size, a maximum size of metadata and a maximum frequency between two instances of the metadata.

The second obtaining code 520 is configured to cause the at least one processor to obtain a task for processing the media content, based on the obtained at least one among the one or more functions, the task having a task descriptor indicating, for the task, a maximum throughput, a minimum buffer size, a maximum size of metadata and a maximum frequency between two instances of the metadata.

The processing code 530 is configured to cause the at least one processor to process the media content, using the obtained task, based on the task descriptor.

The third obtaining code 540 may be configured to cause the at least one processor to obtain, from an NBMP source, a workflow describing the at least one among the one or more functions to be performed, the workflow having a workflow descriptor indicating, for the workflow, a maximum throughput, a minimum buffer size, a maximum size of metadata and a maximum frequency between two instances of the metadata. The at least one among the one or more functions is obtained based on the obtained workflow.

Each of the at least one among the one or more functions, the task and the workflow may be for input resource consumption or output resource production.

Each of the workflow descriptor, the function descriptor and the task descriptor may have a flag indicating whether a respective one of the workflow descriptor, the function descriptor and the task descriptor describes a function group including multiple functions, among the one or more functions.

Based on the flag indicating that the respective one of the workflow descriptor, the function descriptor and the task descriptor describes the function group, the respective one of the workflow descriptor, the function descriptor and the task descriptor further may have a connection map descriptor indicating a connection between the multiple functions and indicating timing requirements parameters of the connection.

The timing requirements parameters may be separate from hardware requirements parameters.

The timing requirements parameters may have, for the connection, a typical delay, an average bitrate, an average throughput, a minimum delay, a maximum delay, a minimum throughput, a maximum throughput and an averaging window.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of processing media content in Moving Picture Experts Group (MPEG) Network Based Media Processing (NBMP), the method being performed by at least one processor, and the method comprising:

obtaining, from a function repository storing one or more functions for processing the media content, at least one among the one or more functions, each of the at least one among the one or more functions having a function descriptor;

obtaining a task for processing the media content, based on the obtained at least one among the one or more functions, the task having a task descriptor, each of the function descriptor and the task descriptor having a flag indicating whether a respective one of the function descriptor and the task descriptor describes a function group including multiple functions, among the one or more functions;

determining, based on a setting of the flag, whether a connection map descriptor exists for the respective one of the function descriptor and the task descriptor; and processing the media content, using the obtained task, based on the task descriptor and on determining, based on the setting of the flag, whether the connection map descriptor exists.

2. The method of claim 1, further comprising obtaining, from an NBMP source, a workflow describing the at least one among the one or more functions to be performed, the workflow having a workflow descriptor, wherein the at least one among the one or more functions is obtained based on the obtained workflow.

3. The method of claim 2, wherein each of the at least one among the one or more functions, the task and the workflow is for input resource consumption or output resource production.

4. The method of claim 2, wherein the workflow descriptor has the flag indicating whether the workflow descriptor describes the function group.

5. The method of claim 4, wherein, based on the flag indicating that the respective one of the workflow descriptor, the function descriptor and the task descriptor describes the function group, the respective one of the workflow descriptor, the function descriptor and the task descriptor further has the connection map descriptor indicating a connection between the multiple functions.

6. The method of claim 2, wherein each of the workflow descriptor, the function descriptor and the task descriptor has a same general descriptor having a same plurality of parameters.

7. The method of claim 2, wherein the workflow descriptor has a source or sink parameter indicating whether the at least one among the one or more functions is to be performed by a media source or a media sink.

8. An apparatus for processing media content in Moving Picture Experts Group (MPEG) Network Based Media Processing (NBMP), the apparatus comprising:

at least one memory configured to store program code; and at least one processor configured to read the program code and operate as instructed by the program code, the program code comprising:

first obtaining code configured to cause the at least one processor to obtain, from a function repository storing one or more functions for processing the media content, at least one among the one or more functions, each of the at least one among the one or more functions having a function descriptor;

second obtaining code configured to cause the at least one processor to obtain a task for processing the media content, based on the obtained at least one among the one or more functions, the task having a task descriptor, each of the function descriptor and the task descriptor having a flag indicating whether a respective one of the function descriptor and the task descriptor describes a function group including multiple functions, among the one or more functions;

determining code configured to cause the at least one processor to determine, based on a setting of the flag, whether a connection map descriptor exists for the respective one of the function descriptor and the task descriptor; and processing code configured to cause the at least one processor to process the media content, using the obtained task, based on the task descriptor and on determining, based on the setting of the flag, whether the connection map descriptor exists.

9. The apparatus of claim 8, wherein the program code further comprises third obtaining code configured to cause the at least one processor to obtain, from an NBMP source, a workflow describing the at least one among the one or more functions to be performed, the workflow having a workflow descriptor, and wherein the at least one among the one or more functions is obtained based on the obtained workflow.

10. The apparatus of claim 9, wherein each of the at least one among the one or more functions, the task and the workflow is for input resource consumption or output resource production.

11. The apparatus of claim 9, wherein the workflow descriptor has the flag indicating whether the workflow descriptor describes the function group.

12. The apparatus of claim 11, wherein, based on the flag indicating that the respective one of the workflow descriptor, the function descriptor and the task descriptor describes the function group, the respective one of the workflow descriptor, the function descriptor and the task descriptor further has the connection map descriptor indicating a connection between the multiple functions.

13. The apparatus of claim 9, wherein each of the workflow descriptor, the function descriptor and the task descriptor has a same general descriptor having a same plurality of parameters.

14. The apparatus of claim 9, wherein the workflow descriptor has a source or sink parameter indicating whether the at least one among the one or more functions is to be performed by a media source or a media sink.

15. A non-transitory computer-readable medium storing instructions that, when executed by at least one processor of an apparatus for processing media content in Moving Picture Experts Group (MPEG) Network Based Media Processing (NBMP), cause the at least one processor to:

obtain, from a function repository storing one or more functions for processing the media content, at least one among the one or more functions, each of the at least one among the one or more functions having a function descriptor;

obtain a task for processing the media content, based on the obtained at least one among the one or more functions, the task having a task descriptor, each of the function descriptor and the task descriptor having a flag indicating whether a respective one of the function descriptor and the task descriptor describes a function group including multiple functions, among the one or more functions;

determine, based on a setting of the flag, whether a connection map descriptor exists for the respective one of the function descriptor and the task descriptor; and process the media content, using the obtained task, based on the task descriptor and whether the setting of the flag indicates that the connection map descriptor exists.

16. The non-transitory computer-readable medium of claim 15, wherein the instructions further cause the at least one processor to obtain, from an NBMP source, a workflow describing the at least one among the one or more functions to be performed, the workflow having a workflow descriptor, and wherein the at least one among the one or more functions is obtained based on the obtained workflow.

17. The non-transitory computer-readable medium of claim 16, wherein each of the at least one among the one or more functions, the task and the workflow is for input resource consumption or output resource production.

18. The non-transitory computer-readable medium of claim 16, wherein the workflow descriptor has the flag indicating whether the workflow descriptor describes the function group.

19. The non-transitory computer-readable medium of claim 18, wherein, based on the flag indicating that the respective one of the workflow descriptor, the function descriptor and the task descriptor describes the function group, the respective one of the workflow descriptor, the function descriptor and the task descriptor further has the connection map descriptor indicating a connection between the multiple functions.

20. The non-transitory computer-readable medium of claim 16, wherein each of the workflow descriptor, the function descriptor and the task descriptor has a same general descriptor having a same plurality of parameters.

* * * * *